Figure 1:
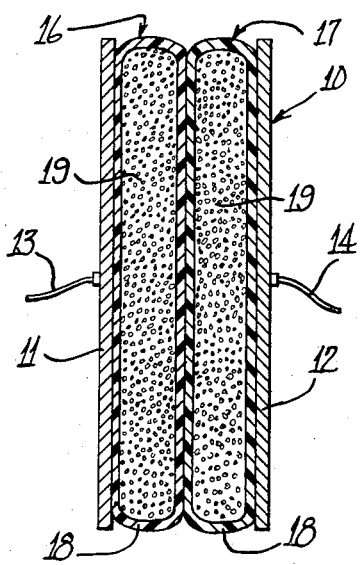

April 15, 1958   M. S. HARDING   2,831,045
BATTERY
Filed Feb. 10, 1955

Inventor
Magnus S. Harding

United States Patent Office 2,831,045
Patented Apr. 15, 1958

2,831,045

BATTERY

Magnus S. Harding, Madison, Wis.

Application February 10, 1955, Serial No. 487,337

8 Claims. (Cl. 136—83)

The present invention relates to an improved battery which is light in weight, relatively free from corrosional effects, and can be manufactured in an extremely small size. In particular, the invention relates to a battery including a pair of spaced electrodes and containing a new type of resinous material referred to as an "electron-exchange" resin interposed between the electrodes, with an electrolyte being associated with the resin to provide the necessary medium for electron transfer.

The battery of the present invention is of the secondary type in that it can be regenerated or recharged after the depletion of the original charge.

The batteries of the present invention have numerous advantages over the present commercially used storage batteries or secondary cells which employ lead accumulators or iron accumulators. Both of these accumulators include heavy metal plates and necessarily employ highly corrosive electrolytes. Because of this, the batteries are heavy, subject to deterioration due to corrosion, and require expensive plate constructions and corrosion resisting containers.

The present invention is directed to a battery which does away with these drawbacks and provides a simple, compact unit cell free from cumbersome and corrosive heavy metal plates.

An object of the present invention is to provide an improved battery construction which, to a large extent, eliminates problems of corrosion.

Another object of the invention is to provide a battery containing an electron exchange resin in finely divided particle form thereby providing a large surface area for electron exchange without the necessity of providing a large mass of resin.

A still further object of the invention is to provide an electron exchange battery composed of a positive cell and a negative cell, each of the cells including an electrode associated with a supply of electron exchange resin which in turn is associated with a suitable electrolyte solution.

Other and further objects and features of the present invention will be apparent to those skilled in the art from the following description, taken in conjunction with the attached drawing which forms a part of this specification.

The battery of the present invention depends for its electrical characteristics upon the unique chemical and electrical properties of materials which are known as electron exchange resins. These materials differ from the more conventional anionic and cationic resins, i. e., the ion exchange resins, in that the electron exchange resins take part in reversible oxidation and reduction reactions which involve the transfer or exchange of electrons. On the other hand, the use of ion exchange resins involves acid-base and metathetical reactions involving the transfer or exchange of protons and ions rather than electrons.

The electron exchange resins (also known as "redox" resins) take many different forms chemically, but in general the most common resins employed for this purpose are polymeric derivatives of hydroquinone. In particular, polymers and copolymers of vinyl hydroquinone have been found to possess the electron exchange property to a large extent. Other materials which possess this property are the N-mercapto methyl polyamides.

The derivatives of vinyl hydroquinone are prepared by benzoylating or acetylating the monomeric compound with acid anhydrides or chlorides. The esters which are produced are then polymerized by the action of heat, usually with the presence of a polymerization catalyst, after which the ester groups are removed by saponification, leaving the polymerized vinyl hydroquinone.

In addition to the straight polymeric materials, suitable resins can be prepared by cross-linking the vinyl hydroquinone during polymerization with other monomers such as styrene.

Inasmuch as the efficiency of the electron transfer is directly related to the surface area of the resin, it is desirable to extend the area per unit volume as much as possible. Hence, the resin is preferably used in the form of a finley divided powder, having a particle size comparable to that of particles of ordinary table salt or smaller.

The electrolyte used in conjunction with the electron exchange resins may be any of a large number of acids, bases, or readily ionizable salts. Particularly good results have been obtained by the use of a combination of polymerized vinyl hydroquinone and a water soluble metallic hydroxide such as sodium hydroxide as the electrolyte. However, other solutions such as solutions of sodium chloride, sodium phosphate, sodium nitrate, sodium sulphate, and the corresponding potassium salts are also very suitable.

Figure 2:
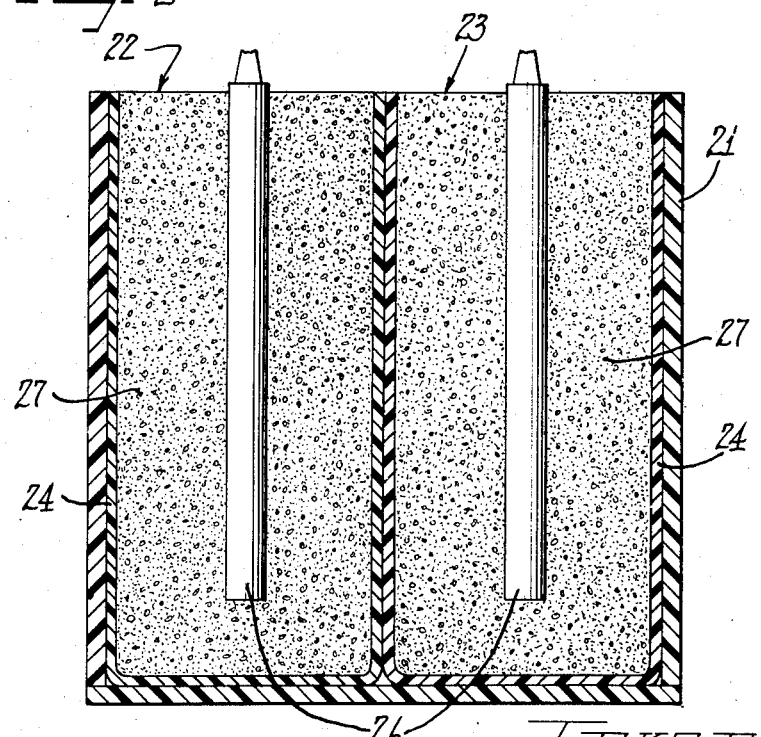

A further description of the present invention will be made in conjunction with the attached sheet of drawings in which:

Figure 1 is a view in cross section, with parts in elevation, of a simplified form of cell embodying the principles of the present invention; and Figure 2 is a cross-sectional view, with parts in elevation, of a modified form of battery embodying the principles of the present invention.

As shown on the drawings:

In the simplified form of the invention shown in Fig. 1, there is illustrated a battery 10 consisting of a pair of spaced electrodes 11 and 12 which may be identical, and which may consist of thin strips of metal or metal foil which is non-reactive toward the electrolyte employed. Where cost is not a particularly important factor, the electrodes 11 and 12 may consist of small pieces of platinum foil. Actually, any electrically conductive metal foil will be operative, although not necessarily with results equivalent to those obtained when using platinum. A lead-in wire 13 extends from the electrode 11, and a similar lead-in wire 14 is provided on the electrode 12.

Disposed between the pair of electrodes, and compressed therebetween, are containers 16 and 17 which may be identical in construction. Each container may consist of a non-reactive electron permeable tube 18 composed of regenerated cellulose, a thermoplastic resin, or the like.

Each of the tubes 18 contains a particulated mass 19 of particles of the electron exchange resin material, preferably of a size comparable to that of particles of table salt. Most conveniently, the resin particles are wetted with an electrolyte solution of the type described in a sufficient amount to cause the particles to become tacky and somewhat adherent. In order to increase the effective electrode area present, it is desirable to include small, electrically conductive particles such as carbon particles along with the resin particles in each of the containers 16 and 17. Normally, the carbon particles should not constitute more than 40% of the volume of the resin particles.

The container 16 and the resin contained therein function to accumulate and store the electrical charge associated with the electrode 11, while the container 17 and its contents serve to store the charge for the electrode 12. Once the containers and the electrodes have been put into assembled relation, the electrodes are polarized by the passage of a direct current through the electrodes 11 and 12 by means of another battery, or a D. C. generator, or the like. For example, if the polarizing current is passed through the battery in a direction such as to make the electrode 12 positive with respect to the electrode 11, the resin particles contained in the container 17 adjacent the electrode 12 will assimilate and store a positive charge, while the resin particles in the container 16 will acquire a negative charge. Once the characteristic voltage between electrodes has been reached, which will normally be on the order of two volts, the polarizing voltage can be removed and the cell will be ready to function as a battery.

It has been found that batteries of this nature will give substantial voltage even in very minute sizes. For example, only 1/10 gram of a vinyl hydroquinone polymer was moistened with an electrolyte and pressed between two platinum foils each measuring one square inch in area. After the polarizing voltage had been removed, the resulting battery developed 1/10 ampere at 1.8 volts.

A modified form of the invention is illustrated in Fig. 2 of the drawings.

In this form of the invention, there is provided a container 21 composed of a relatively rigid, non-conductive material such as rubber, a thermosetting resin, or the like. Included within the container 21 are a pair of cells 22 and 23 which, for most purposes, can be identical in construction. Each of the cells may thus include an outer electron permeable casing 24, with each of the casing 24 supporting a centrally disposed carbon electrode 26 therein. Surrounding the carbon electrode 26 is a self-sustaining body 27 containing the granular particles of the electron exchange resin, added carbon particles, and sufficient amounts of a binder to make the entire mass capable of supporting itself. The particles contained in the mass 27 are also wetted with sufficient electrolyte to conduct current between the electrodes of the battery.

The battery illustrated in Fig. 2 may be polarized in the same manner as described in conjunction with the battery of Fig. 1. For example, the electrodes 26 can be connected to a source of direct current potential such as another battery or a direct current generator in a direction such that current flows from the cell 23 to the cell 22, making the particles in the cell 23 assume a positive charge with respect to the particles in the cell 22. Upon removal of the polarizing current, the electron exchange particles in the two cells will retain the positive and negative charges in their respective cells for extended periods of time. To regenerate the batteries after use, it is simply necessary to repeat the polarizing process and again send a direct current through the battery until the battery again has the desired potential.

In the operation of each of the described batteries, a condition of electron exchange is set up in the resin and occurs between the resin and the electrolyte. The electron exchange creates a condition of electrical disequilibrium in the system, thereby creating a potential difference between the electrodes.

It will be evident that various modifications can be made to descirbe the embodiment without departing from the scope of the present invention.

I claim as my invention:

1. A battery comprising a pair of spaced electrodes, an electron exchange resin between said electrodes, and an electrolyte associated with said electron exchange resin.

2. A battery comprising a pair of spaced electrodes, a granular electron exchange resin between said electrodes, and an electrolyte carried by said resin.

3. A battery comprising a pair of spaced electrodes, a body of electron exchange resin comprising a polymeric derivative of hydroquinone about each of said electrodes, and an electrolyte associated with said electron exchange resin.

4. A battery comprising a pair of spaced electrodes, a body of an electron exchange resin comprising a polymer of vinyl hydroquinone about each of said electrodes, and an electrolyte associated with said polymer.

5. A battery comprising a pair of spaced electrodes, a pair of ion-permeable containers about said electrodes, an electron exchange resin in each of said containers, and an electrolyte associated with said electron exchange resin.

6. A battery comprising a pair of spaced electrodes, a body of an electron exchange resin associated with each of said electrodes, said resin being in the form of a consolidated mass of resin particles held together by a binder, and an electrolyte associated with said resin.

7. A battery comprising a pair of spaced electrodes, a body of granular electron exchange resin about each of said electrodes, said electron exchange resin being wetted with a water soluble metallic hydroxide.

8. A battery comprising a pair of spaced electrodes, a body of an electron exchange resin comprising a polymeric derivative of hydroquinone about each of said electrodes, said resin being in particulated form, and an electrolyte carried by the particles of said resin.

References Cited in the file of this patent

UNITED STATES PATENTS

| | | |
|---|---|---|
| 2,554,447 | Sargent | May 22, 1951 |
| 2,593,540 | Cornwell et al. | Apr. 22, 1952 |
| 2,694,742 | Harding | Nov. 16, 1954 |

FOREIGN PATENTS

| | | |
|---|---|---|
| 73,121 | Holland | Aug. 15, 1953 |

OTHER REFERENCES

Vinyl and Related Polymers, Schildknecht, pages 155–156. (Copy in Div. 50.)